(12) United States Patent
Herring et al.

(10) Patent No.: US 6,623,234 B1
(45) Date of Patent: Sep. 23, 2003

(54) NON-LINEAR SIDED TRAILER WITH CONTINUOUS CONVEYOR BED

(75) Inventors: Robert S. Herring, Norman, OK (US); David N. Griffis, Blanchard, OK (US)

(73) Assignee: Dan Hill & Associates, Inc., Norman, OK (US)

( * ) Notice: Subject to any disclaimer, the term of this patent is extended or adjusted under 35 U.S.C. 154(b) by 0 days.

(21) Appl. No.: 09/528,957

(22) Filed: Mar. 20, 2000

Related U.S. Application Data

(60) Provisional application No. 60/125,129, filed on Mar. 19, 1999.

(51) Int. Cl.[7] .................................................. B60P 1/00
(52) U.S. Cl. ........................................ 414/528; 296/181
(58) Field of Search .......................... 414/528; 296/181, 296/184

(56) References Cited

U.S. PATENT DOCUMENTS

| | | | |
|---|---|---|---|
| 1,805,489 A | * | 5/1931 | Kerr et al. ................... 296/184 |
| 3,731,825 A | * | 5/1973 | Holland ....................... 414/528 |
| 3,844,616 A | * | 10/1974 | Acker ......................... 298/10 |
| 4,005,790 A | * | 2/1977 | Holland ....................... 414/528 |
| 4,055,265 A | | 10/1977 | Eisenman |
| 4,230,360 A | | 10/1980 | Eisenman |
| 4,664,583 A | | 5/1987 | Gust |
| 4,741,431 A | | 5/1988 | Whitehead |
| 4,948,155 A | * | 8/1990 | Smith et al. ............. 280/149.2 |
| 5,102,285 A | | 4/1992 | Gust |
| 5,400,974 A | | 3/1995 | Musso |
| 5,482,356 A | * | 1/1996 | Goodson, Jr. ........... 298/22 AE |
| 5,758,927 A | | 6/1998 | Koester |
| D403,651 S | | 1/1999 | Reiter |

* cited by examiner

Primary Examiner—Donald P. Walsh
Assistant Examiner—Joseph Rodriguez
(74) Attorney, Agent, or Firm—James F. Harvey, III

(57) ABSTRACT

A trailer for use on standard highway systems and having a hopper with a central conveyor belt system forming the floor and two independent, non-linear sides is disclosed for transporting particulate materials such as asphalt, gravel, or low-slump concrete and delivering such materials in a controlled manner to the point of use. The sides of the hopper are formed as segments having a conic section geometry, i.e. circle, ellipse, hyperbola, or parabola. Such hopper sides have different tangential angles for all points on the surface and different rates of change of said angles per unit distance along the side, depending upon the conic segment selected. This design has the novel and unexpected result of producing a vortexing, or mixing, effect on the particulate material, both when it is loaded into the hopper and during transport.

33 Claims, 7 Drawing Sheets

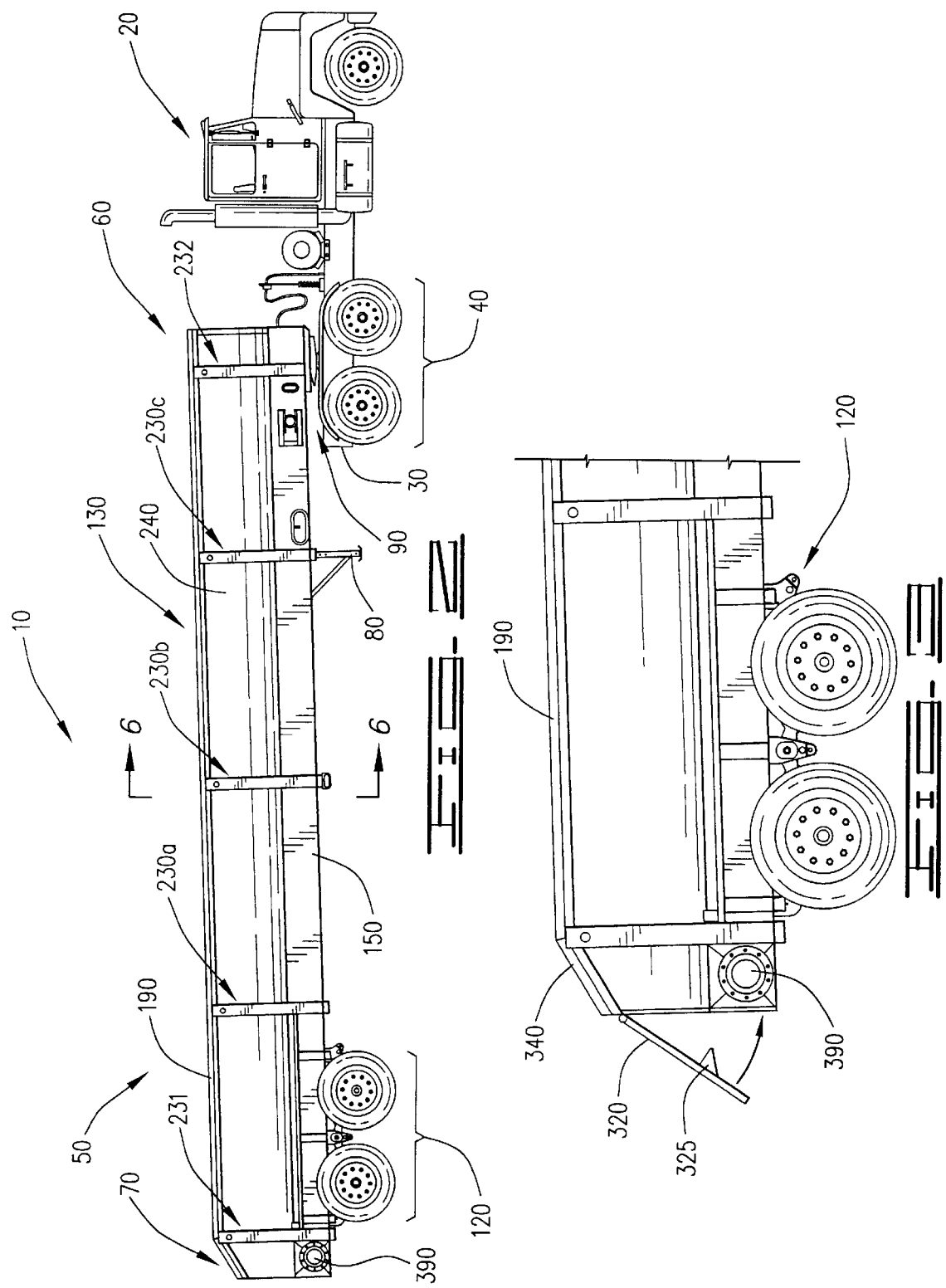

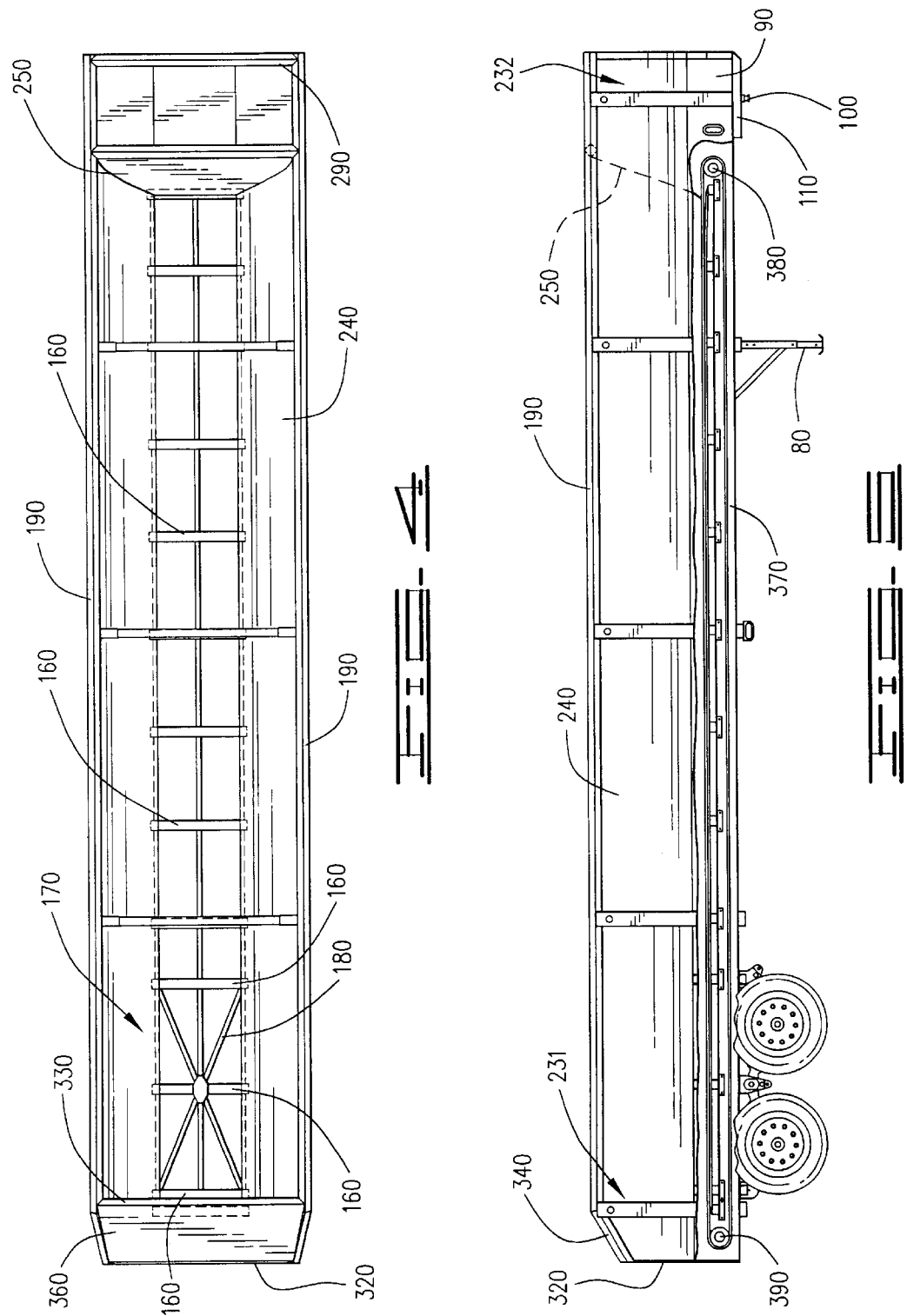

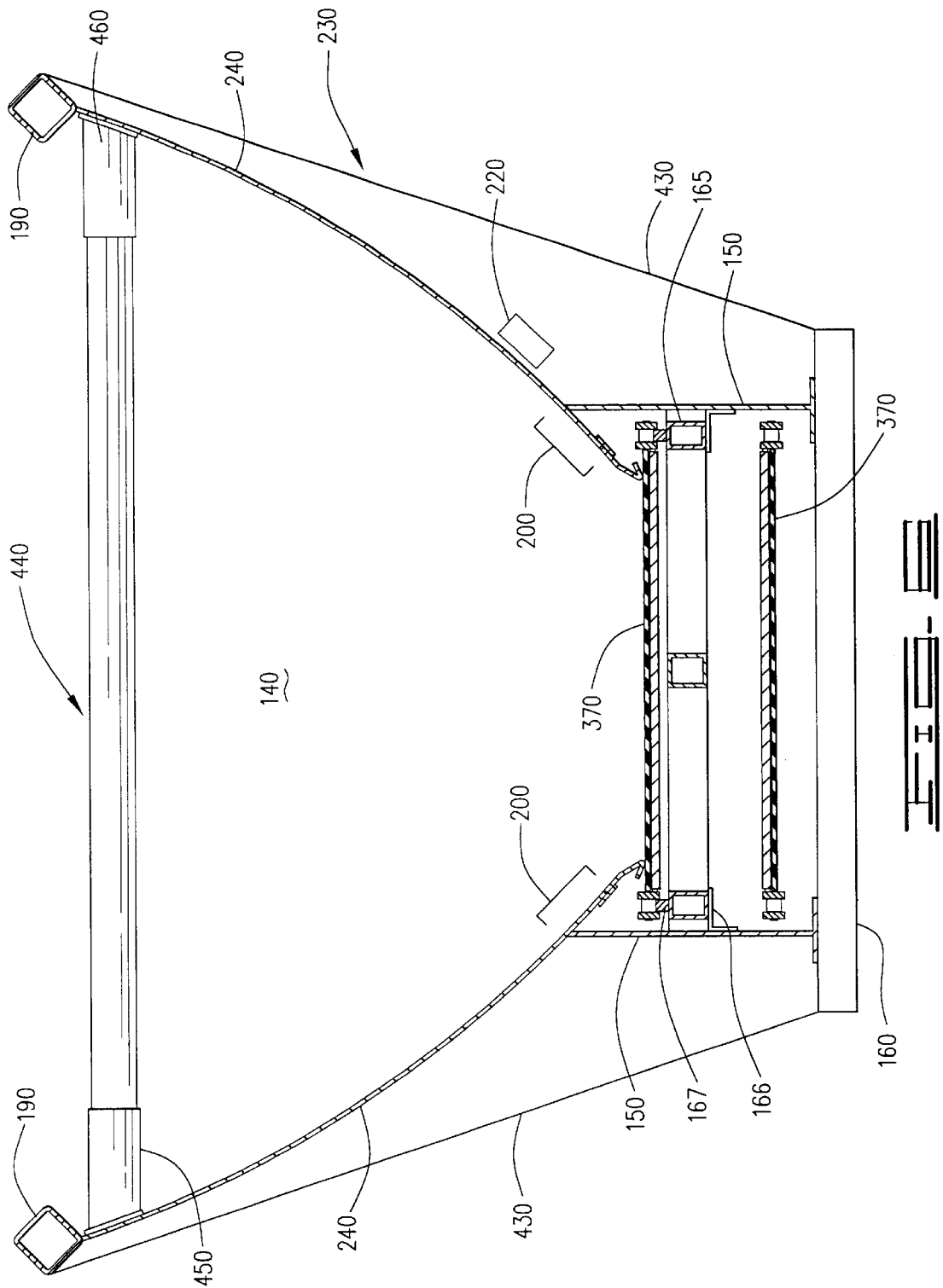

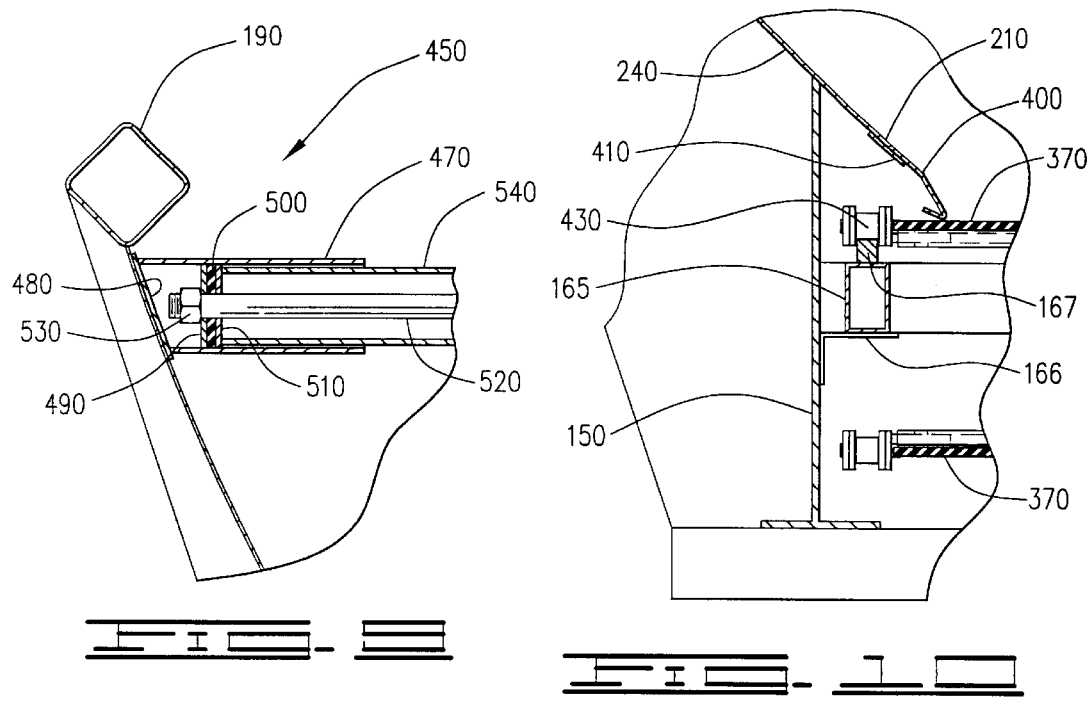
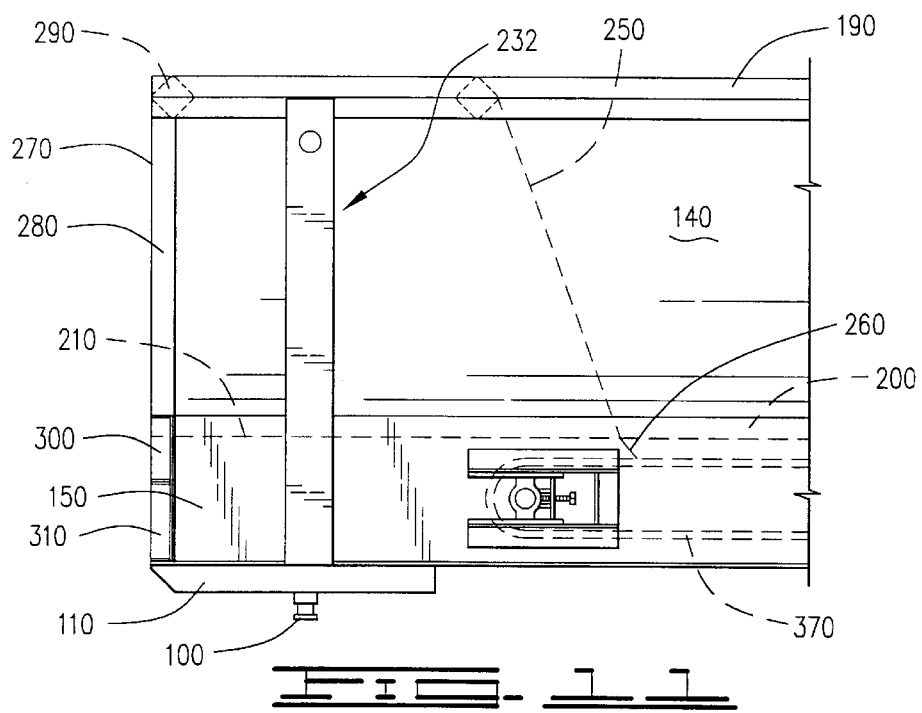

NON-LINEAR SIDED TRAILER WITH CONTINUOUS CONVEYOR BED

CROSS-REFERENCES TO RELATED APPLICATIONS

This application claims priority based on inventor's prior U. S. Provisional Patent Application No. 60/125,129, filed on Mar. 19, 1999.

BACKGROUND OF THE INVENTION

The current invention relates to the field of medium duty trailers for hauling highway construction materials. More specifically, the invention relates to an improved trailer of the type employing a continuous conveyor belt system for delivery of material such as asphalt and low-slump concrete in a controlled manner from a new and novel hopper carrying such material to the rear of the hopper and out the rear end of the trailer, such improvements providing better maneuverability, improved material mixing, lower center of gravity, better weight distribution, and increased payload capacity.

The characteristics of trailers with continuous conveyor belt systems for transportation of construction materials are well known to the industry. They have less tendency to overturn than do end dump trailers when the dump bed is elevated. They require less overhead clearance and are less likely to impact low hanging objects, which is also a concern when a dump trailer is in an elevated position. They can deliver large amounts of material at a controlled rate to the job site.

The art in this area is well known. There have been numerous patents pertaining to conveyor belt systems and rear dump trucks in the literature. Some have employed semi-circular shells, such as U.S. Pat. No. 5,482,356 ("Rear Dump Trailer", Goodson, Jan. 9, 1996). Others, such as U.S. Pat. No. 4,005,790 ("Paving Material Conveyor System", Holland, Feb. 1, 1977), U.S. Pat. No. 4,664,583 ("Trailer with Conveyor Bed", Gust, May 12, 1987), and U.S. Pat. No. 5,102,285 ("Trailer with Continuous Conveyer Bed", Gust, Apr. 7, 1992), describe a flat sided shell with a conveyor belt system mounted underneath. Some describe different types of conveyor belt systems, such as U.S. Pat. No. 4,055,265 ("Bulk Bed", Eisenman, Oct. 25, 1977), U.S. Pat. No. 4,230,360 ("Bulk Material Bed", Eisenman, Oct. 28, 1980), and U.S. Pat. No. 4,741,431 ("Conveyor for Bulk Goods", Whitehead, May 3, 1988). Some types of railroad hopper cars have been observed to have curved sides combined with three bottom discharge chutes along the underside of the car. But to date the combination of independent, discontinuous sides having a cross-sectional aspect of a conic section (or more accurately, with either a circular, elliptical, parabolic, or hyperbolic aspect) with a rear discharge conveyor system has not been considered for such hopper designs The present invention represents a radical design improvement over previous hopper and continuous conveyor belt designs, and in particular, over U.S. Pat. No. 4,005,790, expired, which was owned by the present assignees.

The linear sided conveyor belt trailer presently in common use exhibits a number of deficiencies and problems. First, the fundamental design of the trailer body requires a number of engineering compromises and trade-offs which, although acceptable at the time the trailer was designed, have resulted in several problems. The manner in which the load is supported during road travel results in frequent maintenance on the rear suspension. The original design of the trailer hopper was one of suspension. Two parallel top beams are longitudinally placed at the upper edges of the trailer walls, and from these beams a set of downwardly extending side braces support the side walls of the trailer. These side braces terminate at a pair of longitudinally extending main beams which are positioned above the conveyor belt system and parallel to the ground. The load is essentially suspended from the top beams which must have sufficient strength to support the sides. This increased weight of the top beams tends to raise the center of gravity of the trailer. Furthermore, since trailer weight is a critical factor in the trailer's use on the highway, the design choice was to evenly distribute the weight of the top and bottom beams between the two units. This results in a bottom beam which, although adequate for the task of carrying the load, is at the lower limits of acceptability; road shock and stress is not completely transferred to the trailer and must be absorbed by the rear suspension. This is one factor which results in a high rate of maintenance for the rear suspension.

Also, the basic flat sided trailer hopper design requires a tradeoff between center of gravity and payload. In order to carry an acceptable payload, the height of the hopper walls must be increased, which results in more of the forward end of the trailer exposed to the wind stream. However, this added weight must be distributed between the rear suspension of the trailer and the rear suspension of the tractor pulling the trailer. A gooseneck configuration is typically the means for transferring weight forward to the tractor, and it tends to keep the forward end of the trailer as low as the back end, resulting in less wind resistance. The conveyor belt system is kept lower than the main beams in order to keep the center of gravity low, but this establishes a minimum distance between the gooseneck and the forward end of the conveyor belt apparatus; if the gooseneck is brought too close to the conveyor belt apparatus, then the rear end of the tractor will interfere with the conveyor belt, especially during turning maneuvers. Thus, there is an inherent limitation on the weight ratio carried by the rear suspension of the trailer and by the rear suspension of the tractor due to this minimum gooseneck-to-conveyor distance. Because of this limitation on weight transfer ratio, more weight can only be carried by either raising the trailer walls or lowering the conveyor belt assembly, and thus the bottom of the trailer bed. These factors represent an inherent limitation in the current design.

Road tracking, or the tendency of the trailer to follow the tractor without deviation, is another factor in current designs. If the center of gravity is too high, then the load will sway unacceptably when changing lanes during highway travel, resulting in increased tendency to tip over. The center of gravity can only be raised until this tendency becomes unacceptable and dangerous, especially in emergency situations. Lower center of gravity improves road tracking.

Second, when the conveyor begins to discharge material from the rear of the trailer, two conditions are observed, namely, that the entire load tends to move out of the rear discharge door as a unit, much like a loaf of bread rather than a stream of material, and the material tends to move longitudinally against the sides of the trailer rather than to fall to the conveyor belt. This longitudinal movement of abrasive material along the inside of the trailer walls results in increased wear of the sides and the necessity for their frequent refurbishment.

Third, because the material tends to adhere to the trailer walls and move in mass when the conveyor is operating, the conveyor belt, sprocket, and chain are exposed to increased stress, since the entire weight of the load is temporarily concentrated on the belt. As the belt continues to move, the load breaks up somewhat, but the tendency is still to resist movement and to press on the conveyor belt. This stress results in increased maintenance to the belt and its mechanical parts, namely, the motor, sprockets, and chain.

Fourth, in order to allow for clearance for various aspects of the conveyor belt system; the extreme rear end of the conveyor belt system must stop before encountering the rear discharge door. This leaves a gap in the bed of the trailer through which material can escape. In order to prevent spillage, a hump or wedge was built into the rear discharge door that would fill the gap between the door and the end of the conveyor belt. While this arrangement prevents spillage, it has the tendency to allow transported material to adhere and cake on the top of the wedge. This is a disadvantage of this configuration of rear discharge door.

Thus, it can be seen that there is a need for a device which has the following characteristics:

1. Lower center of gravity;
2. Less wind resistance;
3. Better road trackability;
4. Higher legal payload; and,
5. Stronger structural integrity;

DISCLOSURE OF THE INVENTION

It is a thus an object of this invention to provide a trailer with a continuous conveyor belt system and a hopper with independent side walls each having a conic shape in cross section.

It is a further object of this invention to provide a hopper with independent side walls having of a conic shape in cross section so as to promote the mixing of material both on loading and during transportation.

It is a further object of this invention to provide a trailer which will distribute weight better when cornering than prior trailers with continuous conveyor systems.

It is a further object of this invention to provide a trailer with a lower center of gravity than prior trailers with continuous conveyor systems.

It is a further object of this invention to provide improved tracking during road use for trailers with continuous conveyor systems.

It is a further object of this invention to provide a lighter trailer, i.e. lower tare weight, than prior trailers with continuous conveyor systems.

It is a further object of this invention to reduce wind drag experienced by the trailer as compared to other trailers with continuous conveyor systems.

It is a further object of this invention to provide a means for reducing wear on the inner walls of trailers with continuous conveyor systems as the material is conveyed from the trailer.

It is a further object of this invention to reduce material build-up on the inner sides of the trailer by eliminating flat surfaces in the trailer walls.

It is a further object of this invention to provide an improved weight distribution between the rear axles of the trailer and the tractor, respectively, for trailers with continuous conveyor systems.

It is a further object of this invention to provide improved legal payload for trailers with continuous conveyor systems.

It is a further object of this invention to provide a means of improving the homogeneity of the transported material both when the material is dumped into the hopper of the trailer and when the material is discharged from the rear door of the trailer by the conveyor belt system.

It is a further object of this invention to expose more of the conveyor belt to the material being transported so that the same amount of material can be removed from the trailer at lower speeds or, conversely, more material can be removed from the trailer at the present or higher speeds.

It is a further object of this invention to provide a gravity assist to a trailer having a continuous conveyor belt system to aid the ability of the continuous conveyor belt system to rapidly move material out the rear delivery area of the trailer.

It is a further object of this invention to reduce the dead weight on the conveyor belt system so that the maintenance cycle for the conveyor belt system components is increased.

These and other objects of the invention may be more clearly seen from the detailed description of the preferred embodiment which follows.

SUMMARY OF THE INVENTION

The invention consists of an improved trailer design employing a hopper having independent curved sides to reduce weight and improve strength. Semi-circular containers are well known by skilled practitioners in the art to have properties which equally distribute weight in all directions. This shape has been used for tanks of all kinds for holding liquids or gases. Some trailers have employed this shape for conveying liquids and in hauling materials.

Curved hopper design in the prior art, as disclosed by Goodson (U.S. Pat. No. 5,482,356) for example, is that of a continuous semicircular shell with no break in the shell. Continuous U-shaped ribs with a minimum depth at the top end and increasing to a maximum depth at the bottom end provide a maximum strength at the bottom center and a minimum strength at the upper end., thus providing the maximum strength of the structural trailer body along the longitudinal center of the bottom or floor of the hopper; depth is measured in a direction perpendicular to the outer surface of the hopper. This conventional curved hopper design is best described geometrically as a segment of a conic section, i.e. a circle, with center point midway between the upper edges of the hopper, the segment being a semicircle.

The hopper design of the present invention may be described as a split semicircular design as shown in FIG. 12. The two sides of the hopper are curved as concave segments of different conic sections; for comparison purposes with the prior art, the conic section chosen for each side is that of a circle. The segments comprising each side wall of the hopper forming a part of the present invention are taken from different circles with center points exterior to the hopper and the segments are discontinuous, i.e. if extended, the segments would not meet in a continuous manner. This discontinuous aspect of the hopper sides combines well with a horizontal discharge conveyor system since the conveyor belt forms a floor to the structure and naturally interrupts the curvature of the outer shell.

The hopper of the present invention employs two generally curved sides which may have a circular, elliptical, parabolic, or hyperbolic, aspect, and which meet at a conveyor belt system at their bottom edge. Because of this shape, the pitch of the sides with relation to the conveyor belt can be varied so that more of the belt is exposed to the material being conveyed from the trailer during operation. The strength of the sides is maintained by the use of a system of support structures placed along the external surface of the side walls and spaced longitudinally along the axis of the trailer. If additional strength is necessary, a transverse beam can be added to the top of the support structures so that the support structure forms a continuous band encompassing the side walls of the hopper and the conveyor belt apparatus. This trailer system has been found to result in a lower tare weight and which can thus carry a higher legal payload of material. This trailer system also has a lower center of gravity than comparable conveyor belt trailers and has a better weight distribution ratio between the rear axles of the trailer and the tractor. Additionally, this configuration has the novel and unexpected advantages of reducing material adherence to the sides of the trailer body, thus reducing wear on the inner walls, and of better material mixing when such material is loaded into the trailer. The combination of longitudinal movement of the conveyor belt system and the tendency of the material to fall from the inner walls of the trailer as material is removed from its center results in an unexpected and novel vortex action which further mixes the material; this vortex action is an unexpected benefit of the proposed invention. A further advantage is a lower cross-sectional aspect presented to airflow while the trailer is transported down the road.

The novel and unique configuration of the conveyor belt system with relation to the trailer should be noted. In the previous design by Holland (U.S. Pat. No. 4,005,790), the hopper for carrying material was mounted on twin supporting beams extending longitudinally from the rear wheel and axle assembly to the tractor. The twin supporting beams were kept parallel to the ground by a conventional gooseneck assembly including a conventional fifth wheel for attachment to the tractor. The conveyor belt system was mounted below and suspended from the twin supporting beams.

The present invention configures both the hopper and the conveyor belt system above the twin supporting beams and eliminates the gooseneck assembly. When connected to the tractor, the twin supporting beams are slightly elevated at the forward end of the trailer in a "nose up" attitude. This configuration provides a number of advantages over the previous designs. First, this slight elevation of the nose end of the trailer provides a gravity assist for moving material towards the rear delivery end of the trailer, thus reducing the stress on the conveyor belt motor(s). Other trailers have been observed with this slight nose up attitude. However, the present invention exhibits a more extreme angle which is closer to, but still less than, the angle of repose of the material being transported. This more extreme nose up attitude is made possible by the lower overall height of the trailer, which presents less surface to the wind stream.

Second, by having the conveyor belt system above the twin supporting beams, the distance between the end of the conveyor belt and the fifth wheel attachment point can be reduced, since the conveyor belt is above the plane of the rear deck of the tractor and thus cannot interfere or interact with the rear end of the tractor. This reduction in distance has two further advantages:

a. More legal payload can be carried in the hopper. The previous design had a large dead space between the end of the conveyor belt and the fifth wheel attachment point. In order to carry a given payload, the walls of the hopper had to be extended upwardly which raised the center of gravity and promoted instability. The present configuration allows more of this dead space area to be utilized for payload, which in turn permits the walls of the hopper to be less high for the same amount of payload. This tends to lower the center of gravity and improves stability.

b. A better weight distribution between the rear axle assembly and the tractor axle is achieved. The use of previous dead space for payload moves more of the weight of the payload forward towards the tractor, thus improving the ratio of weight carried by the rear axle assembly and the tractor.

The invention may be employed in any suitable application in which the mixing of particulate material during loading or transportation is desirable. Such applications include trailers for use with fifth wheel tractors, as is described in this application, or vehicles having a suitable frame and structure for mounting the hopper directly on the vehicle, such as a truck. The invention could conceivably find use during intermediate steps of the processing of a material where preliminary mixing of components could be accomplished by simultaneously filling the receiving zone of the hopper from above with the components under the influence of gravity and immediately conveying the resulting mixture out by means of the conveyor belt system. Therefore, description of the invention for use in such specific applications as a trailer or truck is not meant to limit its use to only those applications.

BRIEF DESCRIPTION OF THE DRAWINGS

FIG. 2 is a side view of the trailer and tractor combination and illustrating the nose-up attitude of the trailer as it is towed by the tractor.

FIG. 3 is a close up detail view of the aft end of the trailer, showing details of the rear discharge door.

FIG. 4 shows a top view of the trailer with the conveyor belt removed to display the under carriage more clearly.

FIG. 5 is a partial cutaway of FIG. 2 without the tractor, so as to illustrate the conveyor belt and bottom under carriage structure.

FIG. 6 is a cross sectional view taken at one of the supporting assemblies for the sides of the hopper, giving a view of the curved aspect of the trailer sides and the manner in which the transverse cross braces and coaming stiffeners interrelate.

FIG. 9 shows in greater detail the construction of the ends of the transverse support rod assembly given in FIG. 6.

FIG. 10 shows in more detail a portion of FIG. 6 and gives the manner in which the lower edge of the side walls form a seal with the top of the conveyor belt and details on the conveyor belt supporting structure.

FIG. 11 shows a cutaway side view of the front end of the trailer depicted in FIG. 7, with details of the front binwall and front end of the conveyor belt system.

DETAILED DESCRIPTION OF THE PREFERRED EMBODIMENT

Figure 1:
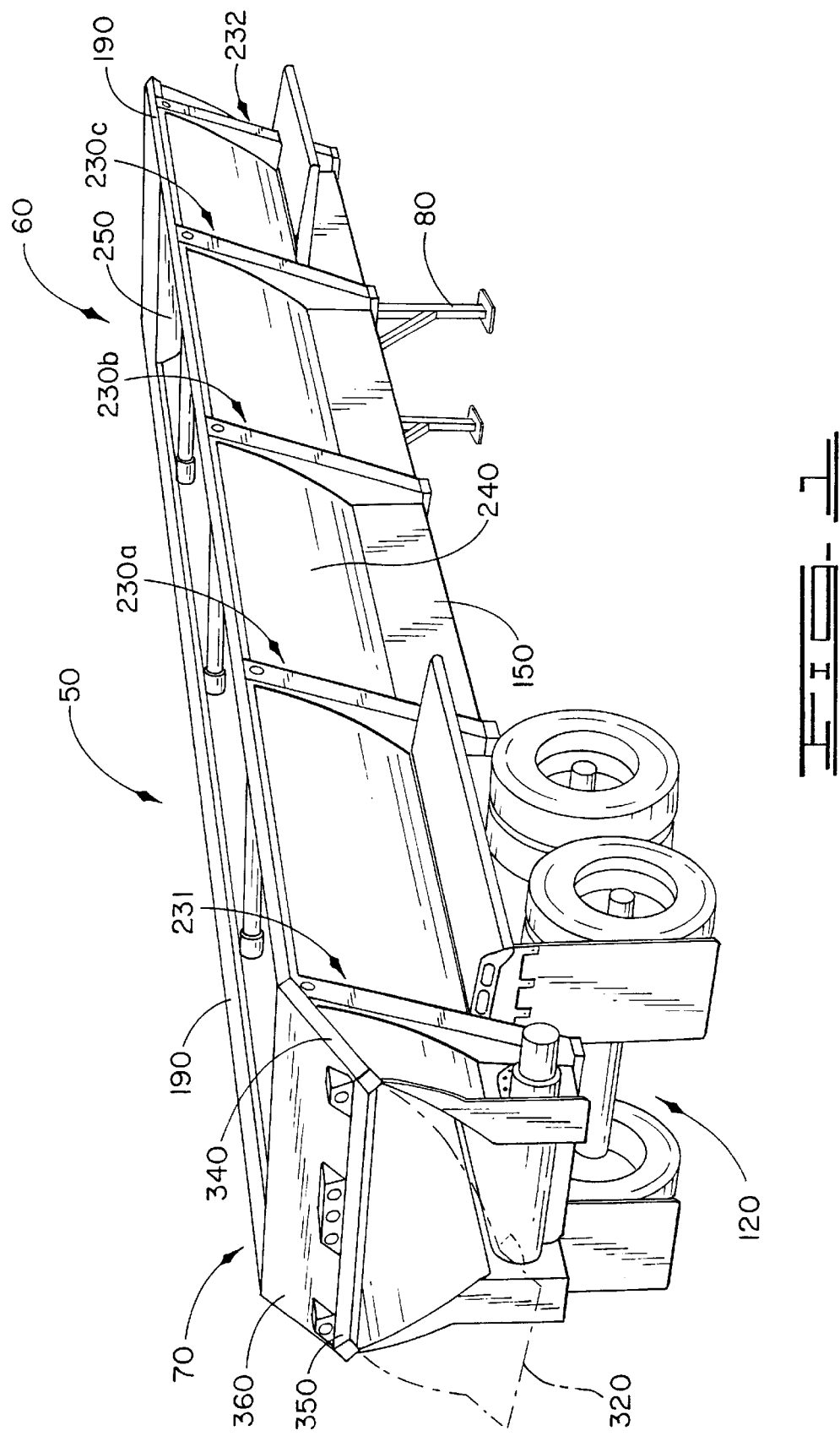
FIG. 1 is a rear perspective view of the trailer which is the subject of the invention.

The preferred embodiment of the invention is illustrated as a tractor-trailer combination in the accompanying drawings and is general designated therein by reference number 10. Referring to FIG. 1 giving perspective view of the trailer 50 and FIG. 2 giving a side view of the tractor-trailer combination 10 employing the invention, the tractor-trailer combination 10 consists of a tractor 20 for transporting a removably attached trailer 50 having a hopper assembly 130 for carrying over standard roads and highways a load of particulate matter, such as asphalt and low-slump concrete, from the location of loading to the location of use. Tractor 20 is of standard design commonly used in the transportation industry and having a fifth wheel 90 for attachment of the trailer 50 to tractor 20 by means of kingpin 100 located at its trailer forward end 60. At the rear end 70 of trailer 50 is located the trailer suspension system 120 of standard design and used for supporting the trailer. Also located at the rear end is the discharge area for the conveyor belt drive system for discharge of material loaded in the hopper assembly 130. When not attached to tractor 20, the trailer 50 is supported by the jack stand 80 which is retracted and stored during use of the trailer on the highway.

Hopper assembly 130 is now described by reference to FIGS. 2, 4, 5, and 6. The hopper cavity 140 of hopper assembly 130 is defined by side walls 240, forward binwall 250, rear discharge door 320, and conveyor belt 370, which is part of the conveyor belt system, to be described in greater detail presently. Conveyor belt 370 functions as the floor of hopper assembly 130. The top of hopper assembly 130 is open so that particulate matter may be loaded from above into hopper cavity 140 at any point along its length. Two non-linear side walls 240 slope downwardly and inwardly between a pair of top beams 190 along the upper edge of side walls 240 and a pair of T-shaped main beams 150 along the lower portion 200 of side walls 240, each of the four beams longitudinally running the length of hopper assembly 130. Each top beam 190 has a square cross section with one corner oriented topmost. This shape provides excellent resistance to outward bending and it also presents no surface upon which material can adhere or collect during loading of hopper cavity 140. The main beams 150 are maintained in spaced relationship with one another by a plurality of support bars 160 spaced longitudinally along the length of main beams 150, the spacing being sufficient to accommodate a conveyor belt system therebetween, to be described presently. Forward binwall 250 extends downwardly and rearwardly between the top beams 190 so that its lower edge approaches conveyor belt 370 to allow conveyor belt 370 to move thereunder without excessive spillage of particulate material between the lower edge of forward binwall 250 and conveyor belt 370. A replaceable flexible gasket 260 (FIG. 11) is attached to the lower edge of the forward binwall 250 to make continuous frictional contact with conveyor belt 370 so as to prevent loss of material between forward binwall 250 and conveyor belt 370. Forward binwall 250 may be planar or non-linear like side walls 240, but for ease in construction, the preferred embodiment is that of a planar wall.

The preferred embodiment as shown depicts the top beams 190 and main beams 150 as being generally horizontal and parallel with each other, with a slight nose-up attitude at the forward end which will be presently described. However, the invention can also be practiced by maintaining the top beams 190 in a generally horizontal orientation with the main beams 150 being tilted upwards at their forward end, while utilizing coaming stiffeners 430, each pair of which are progressively shorter in length as they are employed from the aft end to the forward end. The preferred embodiment has been found to be easier to manufacture, but this second embodiment could be employed so as to permit different trailer lengths while still providing a nose-up attitude.

The conveyor belt system is not detailed in the drawings, but is substantially the same as that contained in U.S. Pat. No. 4,005,790, by Holland, that portion of which is included herein by reference. As shown in FIG. 5, it is comprised of a conveyor belt 370 urged into motion by means of an aft sprocket 390 defining the rear end of the conveyor belt system and a forward sprocket 380 defining the front end of the conveyor belt system and located forward of and adjacent to binwall 250. When in motion, conveyor belt 370 moves material in the hopper towards the rear discharge door 320 where the material falls from the aft end of conveyor belt 370 as it moves over aft sprocket 390. The conveyor belt surface is exposed on its return movement towards the forward end of the trailer so that any material adhering to conveyor belt 370 can fall from the belt through the brushing action of a belt wiper (not shown) located at some point on the bottom side of the conveyor system. As viewed in FIG. 5, conveyor belt 370 maintained in counterclockwise motion by driving each of the sprockets 380, 390, both driven by a single hydraulic motor (not shown). It should be noted that while U.S. Pat. No. 4,005,790, by Holland, is included by reference as a description of the conveyor belt system in use by the invention in order to better describe the invention, the use of this particular conveyor belt design does not preclude the use of other styles of conveyor belt systems with the invention.

The lower portion of side wall 240 is shown in more detail in FIG. 10. Main beam 150 is supported a sufficient distance from lower edge 210 of side wall 240 so that lower edge 210 extends over conveyor belt 370. A narrow sealing edge 400 made of a non-resilient material such as steel, aluminum, or other rigid material is affixed to the exterior surface of side wall 240 by means of a series of gussets 410 extending the length of side wall 240, or as by welding or other means well known to the art, thereby joining lower edge 210 with sealing edge 400 so that the inner surface of side wall 240 is smooth. Note that sealing edge 400 does not follow the curvature of side wall 240. Sealing edge 400 extends from lower edge 210 to make brushing contact with conveyor belt 370, thus preventing excess particulate material from spilling therebetween also and protecting rollers 420. Support bars 160 are held in spaced relation with one another by three intermediate beams 165 extending longitudinally from the forward end to the aft end of trailer 50. The outermost intermediate beams 165 are supported by a plurality of L-shaped brackets 166 and in turn support rails 167 upon which the rollers 430 of the conveyor belt system ride.

Sealing edge 400 is located at a point in hopper cavity 140 where abrasion is considered to be at a maximum. An abrasive resistant material such as AR235 steel, well known to the industry, is used for the construction and composition of sealing edge 400. The use of a non-flexible rigid material to form a seal with the conveyor belt 370, rather than a rubber gasket material which is flexible, is considered to be new and novel and provides a benefit of long service life before replacement. Note that sealing edge 400 extends a short distance which is tangent to the lower edge of side wall 240 and then angles downward to make brushing contact with conveyor belt 370. This aspect of the sealing edge 400 will be discussed in more detail later.

Referring again to FIGS. 2, 4, 5, and 6, side walls 240 are supported by one or more external support assemblies 230a–230c, 231, 232. In the preferred embodiment as shown in FIG. 2, five such support assemblies are shown spaced longitudinally along the length of side walls 240. Aft support assembly 231 is located proximate to the aft end 70 of trailer 50, forward support assembly 232 is located proximate to the forward end 60 of trailer 50, and three support assemblies 230a–230c are shown longitudinally spaced along side walls 240 in between. The particular details characteristic of each of the three intermediate support assemblies 230a–230c are shown by the cross sectional drawing in FIG. 6. A pair of independent coaming stiffeners 430 transversely extend from side walls 240 and main beams 150. Each coaming stiffener 430 increases in depth, as measured in a direction perpendicular to the outer surface of side wall 240 from the stiffener's upper end to its lower end at the bottom of side wall 240. The top end of coaming stiffener 430 is affixed to the top beam 190 as by welding. Coaming stiffener 430 is permanently affixed along its entire inner edge to side wall 240, the vertical and horizontal surfaces of main beam 150, and support bar 160, as by welding. In this manner, more lateral support is provided to side walls 240 at the bottom where outward pressure is greater, than at the top end where the outward pressure is less. Coaming apertures 220 in the coaming stiffeners 430 allow brake and electrical lines to run from one end of the trailer 50 to the other.

Additional support to restrain side walls 240 from outward movement can, if needed, be provided by connecting the upper ends of a pair of opposed coaming stiffeners 430 by means of a rigid transverse beam welded to the top beams 190. However, the preferred embodiment of such a restraint is the transverse support rod assembly 440, shown generally in FIG. 6 and in detail at FIG. 9. A collar assembly 450 is formed as a collar 470 consisting of a short section of cylindrical pipe which is cut at an angle at one end and welded to collar plate 480. The collar assembly 450 so formed is welded to inner wall of side wall 240 at its upper edge immediately below top beam 190. A second collar assembly 460 is similarly mounted on the opposed inner side of side wall 240 so that the central axis of first collar assembly 450 is horizontally oriented and colinear with the central axis of second collar assembly 460. Within each collar assembly 450, 460 is permanently welded a vertically oriented, circular plate 490. One end of a rod 520 is axially oriented and affixed to plate 490 either by inserting rod 520 through a central hole in plate 490 and securing it thereto by nut 530, as shown, or by other means such as welding. Rod 520 is inserted through a shock absorbing disk 500 and a large washer 510, each having a central hole and of diameter slightly less than the inner diameter of collar 470, so that the shock absorbing disk 500 is positioned adjacent to plate 490 and large washer 510 is positioned adjacent to the shock absorbing disk 500. Rod 520 is inserted through a pipe 540 having an outer diameter slightly smaller than the inner diameter of collar 470 and is affixed at its second end to second collar assembly 460 in the same manner of attachment as described for collar assembly 450, with pipe 540 being received at each of its ends by collar assemblies 450, 460, thus forming the transverse support rod assembly 440. It is sized so that, when hopper cavity 140 is empty and at rest, rod 520 and opposed collar assemblies 450, 460 may be positioned immediately below top beam 190 with both ends of pipe 540 resting against washers 510 within collar assemblies 450, 460 without compressing the respective shock absorbing disks 500. When the material delivery system is in motion, outward movement of side walls 240 is constrained by rod 520; inner movement of side walls 240 is constrained by pipe 540 and excess shock is absorbed at either end of pipe 540 by shock absorbing disks 500. Furthermore, pipe 540 can rotate within collar assemblies 450, 460 so that particulate matter being loaded into hopper cavity 140, when it strikes pipe 540, causes pipe 540 to rotate so as to prevent build-up of matter on the top surface of pipe 540.

The aft support assembly 231 and the forward support assembly 232 are constructed similarly to support assemblies 230a–230c, with the exception that each has a transverse beam permanently connecting the upper ends of coaming stiffeners 430, i.e. upper rear transverse beam 330 connects the upper ends of coaming stiffeners 430 comprising aft support assembly 231 and forward transverse support beam 290 connects the upper ends of coaming stiffeners 430 comprising forward support assembly 232.

Figure 12:
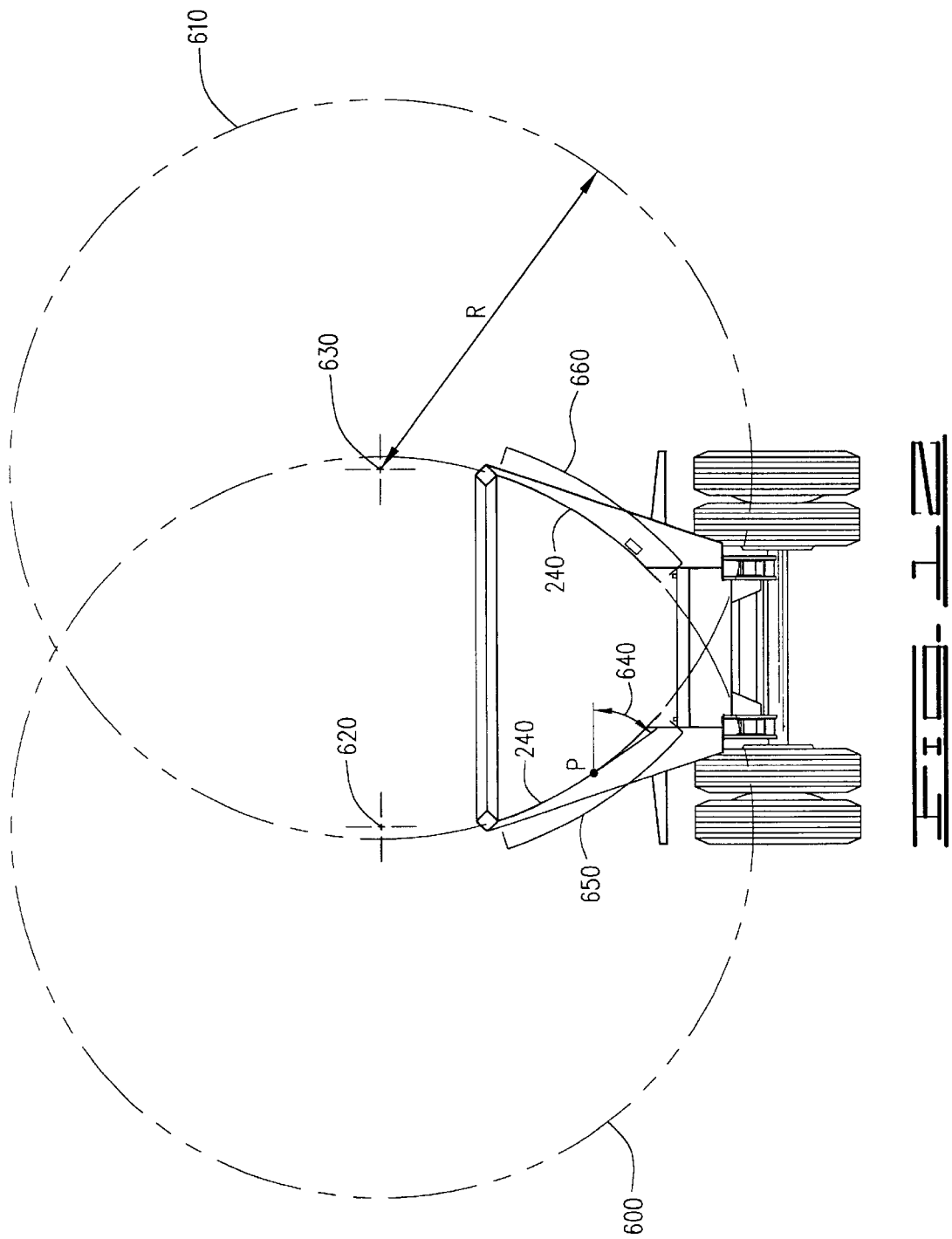
FIG. 12 shows the geometry relating to the design and construction of the side walls of the hopper.

Referring to FIG. 12, each side wall 240 is formed from a segment of a conic section. The choice of conic section for each of the two side walls 240 is independent of the other. While any conic section may be used, i.e. parabola, hyperbola, ellipse, or circle, the preferred embodiment as shown is that of two independent circles each having the same radius R. Circle 600 is drawn so that its focus, or center 620, is external to and above the hopper assembly 130. Similarly circle 610 is drawn so that its center 630 is also external to and above hopper assembly 130. The curvatures of the side walls 240 are selected as segments 650 and 660 taken from circles 610 and 600, respectively. The exact location of the foci with respect to hopper assembly 130 and the radii of the circles 600, 610 are chosen so as to minimize the height of the upper edge of side walls 240 above the supporting surface, thus keeping the center of gravity of a fully loaded hopper assembly low, while keeping the tangential angle 640, as measured at each point P along segments 650 and 660, greater than the angle of repose of the material for which the material delivery system 10 is to transport.

It is well known in the art that the angle of repose for a material is that angle from the horizontal beyond which the material will overcome friction and begin to move along a surface in response to gravity, all other influencing forces being absent. For surfaces tilted an angles less than a material's angle of repose, the material will remain at rest. When the surface upon which the material rests is tilted an angles greater than the material's angle of repose, then the material will overcome its innate frictional coefficient and inertia and will move in response to gravitational force. As can be seen from FIG. 12, angle 640 is large for points P high on side walls 240. For points P lower on side walls 240, angle 640 becomes progressively less. By designing the side walls as separate and distinct segments from two different conic sections, rather than as a continuous segment from a single conic section, then the values for tangential angle 640 which are less than the angle of repose for a given material can be eliminated from consideration. Furthermore, this choice of two separate and distinct side walls 240 allows the imposition of a conveyor belt system therebetween for movement of particulate matter contained within the hopper cavity 140 out the rear discharge door 320. The rate of change of angle 640 is determined by the selection of conic section; in the case of the preferred embodiment, the choice of a circle results in a constant rate of change in angle 640 along side walls 240.

A wide range of design choices results from the selection of type of conic section, focal position, focal length (or radius, in the case of a circle), and particular conic segment. Once the designer knows the range of materials for which the hopper assembly 130 is to be designed, then these choices are fairly straightforward decision that should not involve undue experimentation. However, regardless of which choice is made, a surprising and unexpected result is observed when particulate matter is loaded into a nonlinear sided hopper cavity 140 from above, namely, a vortex action occurs as material contacts the side walls 240 and rebounds towards the interior of hopper cavity 140, resulting in better and more complete mixing of aggregate materials than heretofore. While the reasons for this vortexing action are not fully understood at this time, it is thought that the different angles of incidence for particles falling from a vertical height and striking different points P on the side walls 240 results in particles entering the interior of hopper cavity 140 with different directions and speeds, which sets up the conditions for a general vortexing effect; this would not be observed in a linear sided hopper since vertically-dropped particles striking the side walls at any point would always be reflected at the same angle and direction. A second surprising and unexpected result has also been observed. Prior to the invention, materials carried in conventional linear sided hoppers tended to separate into regions of different compositions because of road vibration during ground transportation from the loading site to the destination site, resulting in uneven mixture and composition of the contents when it is delivered; it has been observed that materials delivered in non-linear sided hoppers designed according to the present invention, i.e. with independent, non-linear sides, tend to remain as mixed as they were at loading and do not separate as a result of road vibration. The reason for this result is not fully understood at this time, but it is also thought to result from the different values of angle 640 for points P on the side walls 240.

Sealing edge 400 (FIGS. 6 and 10) is employed not only to prevent particulate material from escaping between the lower edge 210 of side wall 240 and conveyor belt 370, but also to help prevent material build-up along lower edge 210 as the angle 640 approaches the angle of repose for the particular material being transported. Note that sealing edge 400 extends a short distance along the tangent line drawn at the lower edge 210 and then angles towards conveyor belt 370, thus reversing the continuous decrease of angle 640 as point P moves towards lower edge 210 and preventing possibility of material buildup along lower edge 210.

Figure 7:
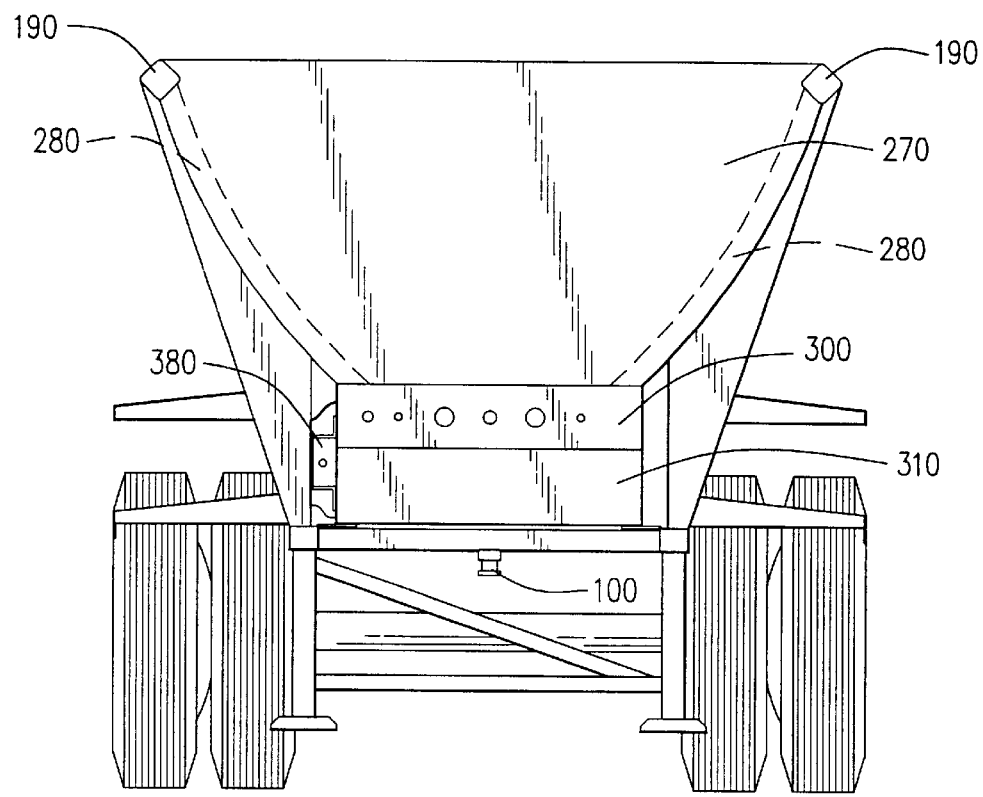
FIG. 7 gives a view of the front of the trailer, showing the details of the front bulkhead and plates used to strengthen the frame.

Directing our attention now to the forward end 60 of the trailer 50 and to FIGS. 2, 7, and 11, forward support assembly 232 is located between binwall 250 and front 20 bulkhead 270. Front bulkhead 270 is given support on either side by forward reinforcing ribs 280 constructed of curvilinear angle iron material and across its top by forward transverse support beam 290. The area between the binwall 250 and the front bulkhead 270 contains mechanical accessories necessary for trailer operation, such as the oil reservoir (not shown) and the conveyor belt drive. King pin 100 is mounted on a reinforced bolster assembly 110 securely attached to the underside of main beams 150 at their forward ends and directly below the forward support assembly 232 for better stability and strength. An upper plate 300 and a lower plate 310, each having their ends bent to form flanges, are positioned at the forward ends of main beams 150 and securely fixed by means of the flanges to the external surface of each main beam 150 by bolts, welding, or other suitable means. Plates 300, 310 are designed to couple the main beams 150 together so as to minimize independent movement of each beam resulting from torque when the loaded trailer traverses uneven surfaces and also to minimize stress on front bulkhead 270.

The primary support for trailer 50 is provided by main beams 150 which must be substantially constructed. In other trailer designs employing conveyor belt systems, the conveyer belt system is mounted below the main beams and the position of the king pin must be moved forward to allow sufficient clearance between the forward edge of the conveyor belt system and the rear end 30 of the tractor. Since the conveyor belt assembly in the present invention is positioned between main beams 150 and does not extend below their bottom edges, then clearance between the tractor rear end 30 and the forward sprocket of the conveyer belt assembly is not a consideration, since the main beams 150, along with the forward sprocket, will be above the point of connection between the king pin 100 to the fifth wheel 90 of tractor 20. The distance between king pin 100 and the hopper cavity 140 can be reduced to transfer the center of gravity forward towards tractor 20, which results in several advantages. The forward transfer of the center of gravity allows more of the payload weight to be supported by the rear suspension system 40 of tractor 20, and reduces the proportion of payload carried by the trailer suspension system 60, thus reducing maintenance of the trailer suspension system 60 and improving road handling of the tractor/trailer combination.

Mounting of king pin 100 and reinforcement bolster 110 to the bottom surface of the main beams 150 results in a slight elevation, or nose-up attitude, of the forward end 60 of trailer 50 when connected to fifth wheel 90 of tractor 20. The angle of elevation from the horizontal depends on a number of considerations, including inflation of the tires on the trailer 50 and the tractor 20; weight of trailer 20 and payload; and length of trailer 20. It has been found that an angle of elevation of from 2° to 7° is optimal for trailer lengths of from 40 feet to 45 feet, with the preferred length being 42 feet. It has been found that having a slight angle of elevation of the forward end 60 of trailer 50 produces a surprising and unexpected result, namely, that it provides a gravity assist to the conveyor belt system when unloading material, thus reducing power requirements for movement of the conveyor belt system and also improving maintainability for the conveyor belt system. Normally gravitational force acts in a vertical direction perpendicular to a horizontally-oriented conveyor belt; however, by elevating forward end 60, the conveyor belt is no longer horizontal but slightly tilted and gravitational force acting on the conveyor belt is split into a vertical component and a horizontal component directed rearward. This results in a gravitational assist whenever the conveyor belt system is placed into motion.

Note that, if the hopper were configured as being a component of a dump trailer, then this method of gravitational assistance would not be necessary since the elevation action required to dump the contents of the hopper by its nature would employ the necessary gravitational assistance. However, when configured with a conveyor belt system, the slight nose-up attitude provides a similar assistance to the unloading process.

Figure 8:
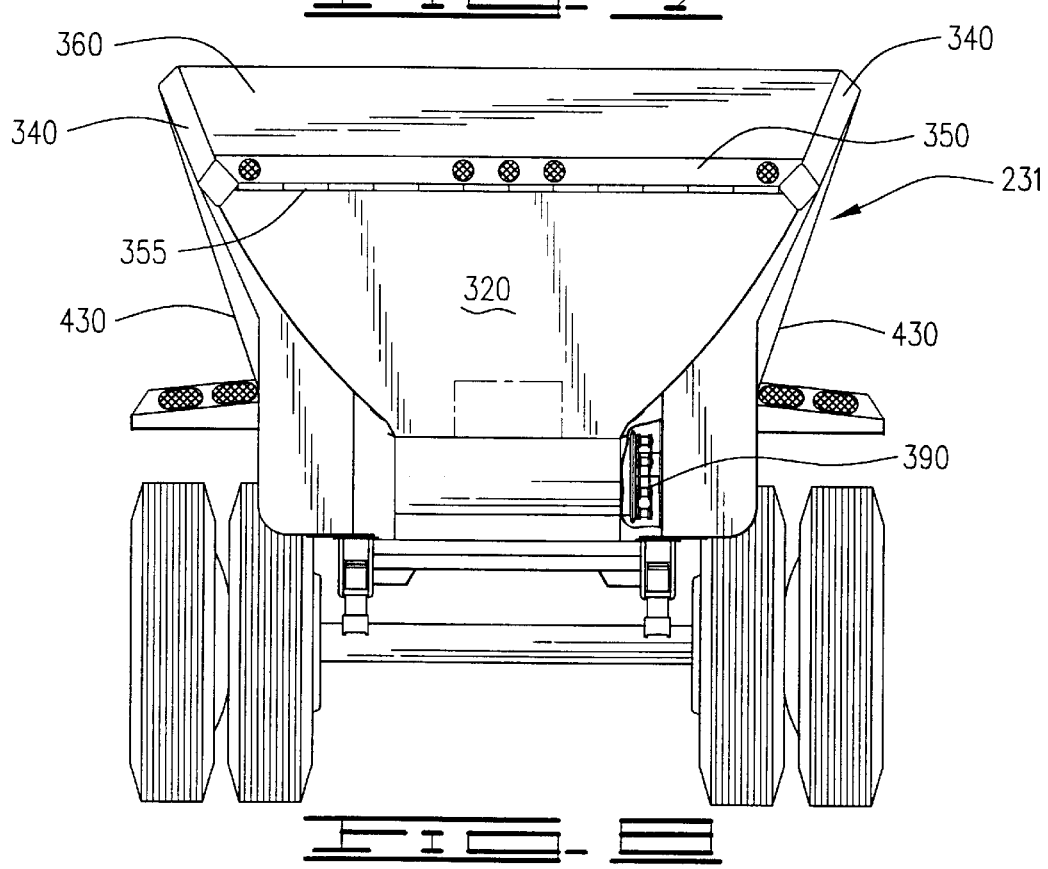
FIG. 8 shows a rear view of the trailer with the manner in which the rear discharge door is attached.

The aft end 70 of trailer 50 is best described by reference to FIGS. 2, 4, and 8. A trailer suspension support assembly 170 consisting of the three aftmost support bars 160 interconnected by diagonal struts 180 is secured to main beams 150 to provide a reinforced area to support and transfer the weight of trailer 50 to the trailer rear suspension system 120 attached immediately thereunder. The aft support assembly 231 is identical to support assemblies 230*a*–230*c* described previously, with the exception that a upper rear transverse beam 330 which is fixed in place connects the upper ends of coaming stiffeners 430 comprising support assembly 231. Two short descending top beam extensions 340 having the same cross sectional aspect as top beams 190 extend downwardly and rearwardly from the ends of top beams 190. The rear discharge door 320, shown in FIGS. 2, 3, and 8, is pivotally attached to the lower edge of lower rear transverse beam 350 by a hinge means 355 so as to open outwardly and in the direction of movement of conveyor belt 370. Deck plate 360 is fitted to the top side of the rectangle formed by two descending top beam extensions 340, upper rear transverse beam 330, and the lower rear transverse beam 350, and serves as a shield to prevent material carried in the hopper from being blown from the hopper by wind as the trailer is in motion.

The location of rear discharge door 320 can be varied depending upon the application and is not confined to the extreme external end of the trailer. For example, some applications have located a transverse beam a distance forward of the upper rear transverse beam 330 and hinged from the lower portion of that additional transverse beam a rear/discharge door having a shape conforming to the curved aspect of side walls 240. Such a positioning of rear discharge door 320 necessarily limits the useful volume of the hopper cavity 140 and restricts the distance of conveyor belt 370 extending aft of rear discharge door to function as only a conveying mechanism and not as a floor for the hopper. However, this may be desirable in order to move forward the center of gravity of material being hauled in the hopper and to thus lower the weight carried by the trailer rear suspension system 120.

In operation, the conveyor belt surface receives particulate matter which is dropped into the hopper cavity 140 from above. The particulate matter collects on the upper surface of the conveyor belt 370 and extends up the side walls 240 as the hopper cavity 140 is filled, so that the conveyor belt surface forms a receiving zone for the hopper cavity 140. As particulate material dropped from above bounces off of the side walls 240 at various angles, a vortexing, or mixing, effect is observed as the hopper cavity 140 is filled. When the conveyor belt 370 is activated, it shears off the bottom layer of matter which is immediately resting on the conveyor belt surface and conveys the sheared material out the delivery zone formed generally by rear discharge door 320 and aft belt sprocket 390. As material is removed from below, more material from above fills the volume vacated by the removed material. It has been observed that linear-sided hoppers tend to exhibit a "bread loaf" effect, in that movement of the conveyor belt 370 tends to move the material immediately resting on the belt as well as all the material immediately above the conveyor belt as a unit, or "loaf". This causes undue strain on the motors of the conveyor belt assembly. The design of side walls 240 of the present invention is such that angle 640 can be made not only to change for all points on the side wall, but also to exhibit a varying rate of change for unit distance along the side wall. This changing angle 640 tends to keep particulate material from adhering to the sides, since angle 640 will be more than the angle of repose for the material for each point on side walls 240 and since the changing angle 640 causes a mixing or circular action within the particulate matter. Also, the slight nose-up attitude of the hopper assembly 130 provides a gravity assist in the direction of movement of conveyor belt 370 which also tends to keep particulate material from clumping or adhering to the side walls 240.

While only a preferred embodiment has been illustrated and described, obvious modifications may be made within the scope of this invention and the following claims without substantially changing its functions. Accordingly, the scope of the invention should be determined not by the embodiments illustrated but by the appended claims and their legal equivalents.

The invention claimed is:

1. A trailer for removable connection to a fifth wheel on a tractor for transportation, said trailer comprising:
   a. a hopper having a forward end and an delivery end and comprising:
      (1) two opposed side walls, each said side wall of a conic shape in cross section that is discontinuous of and independent of the conic shape of the opposed side wall, each said side wall having a top edge, a bottom edge, and an outer surface;
      (2) a parallel pair of upper beams, each said upper beam extending longitudinally along said upper edge of said side wall; and
      (3) a parallel pair of main beams, each main beam having a top side and a bottom side, the main beams extending longitudinally along the bottom edges of the two opposed side walls;
   b. a plurality of generally parallel transverse support structures spaced along the length of said hopper to provide support for said side walls and secured to the outer surfaces of said side walls, each said support structure comprising:
      (1) two opposed coaming stiffeners, said coaming stiffener fixed to said outer surface of each said side wall, the coaming stiffener with a top end and a bottom end, the coaming stiffener connected at its top end to the upper beam extending longitudinally along said upper edge of the said side wall and connected at its bottom end to the said main beam extending longitudinally along the said bottom edge of said side wall, the coaming stiffeners being of a minimum depth at its top end and being of a maximum depth at its bottom end, the depth measured in a direction perpendicular to the said outer surface of the said side wall;
      (2) a bottom support member extending between and connecting said bottom ends of the opposed coaming stiffeners; and
   c. a conveyor means disposed between the main beams and below the bottom edges of the side walls to function as a floor for the hopper, the conveyor means with a receiving zone for receiving particulate material for movement towards the delivery end of the hopper for the purpose of discharging particulate material from said hopper.

2. The trailer recited in claim 1, further comprising a sealing edge longitudinally extending along each of said bottom edges of said side walls, said sealing edge making brushing contact with said receiving zone of said conveyor means, said sealing edge being composed of rigid abrasive-resistant material.

3. The trailer recited in claim 2, wherein the sealing edge is composed of AR235 steel.

4. The trailer recited in claim 2, wherein the sealing edge is composed of aluminum.

5. The trailer recited in claim 1, further comprising a means for enabling a horizontal component of gravitational force to assist movement of particulate material by said conveyor means from said receiving zone towards said delivery end.

6. The trailer recited in claim 5, wherein the means for enabling a horizontal component of gravitational force to assist movement is provided by elevation of the forward end by an angle of elevation above the horizontal, the elevation accomplished by mounting a tractor towing means to the bottom of the at least one main beam.

7. The trailer recited in claim 6, wherein the tractor towing means comprises a bolster assembly fixedly attached to the bottom of the at least one main beam and a downwardly directed king pin connected to the bolster assembly.

8. The trailer recited in claim 6, wherein the angle of elevation is between 2° and 7°.

9. The trailer recited in claim 1, further comprising a front hopper wall positioned at the forward end of said hopper and interposed between the two said side walls, and a discharge door positioned proximate to said delivery end of said hopper.

10. The trailer recited in claim 1, wherein each of said sides of said hopper are formed as a segment of a circular conic section.

11. The trailer recited in claim 1, one or more said support structures further comprising a transverse beam connecting said top ends of said two coaming stiffeners.

12. A trailer for removable connection to a fifth wheel on a tractor for transportation, said trailer comprising:
   a. a conveyor means for transporting particulate material from a receiving zone to a delivery end spaced from the receiving zone;
   b. a hopper means disposed above said receiving zone of said conveyor means and comprising a pair of side walls of a conic shape in cross section, each side wall having a bottom edge and disposed along the sides of said conveyor means, and an end wall disposed across the end of said conveyor means remote from said delivery end, said side walls extending beyond said receiving zone toward said delivery end of said conveyor means; and
   c. said hopper means having an open delivery end whereby the particulate material will tend to shear longitudinally along the length of the receiving zone and will be delivered from the receiving zone to the delivery end at a volumetric rate determined by the speed of the conveyor means; and
   d. a sealing edge longitudinally extending along each of said bottom edges of said side walls, said sealing edge making brushing contact with said receiving zone of said conveyor means, said sealing edge being composed of rigid abrasive-resistant material.

13. A non-linear sided hopper for carrying and discharging particulate material, said hopper with a forward end, a delivery end spaced from said forward end, and a receiving zone between said forward end and said delivery end, said hopper comprising:
   a. two opposed side walls in spaced relationship with one another, each said side wall of a conic shape in cross section, each said conic shape being discontinuous of and independent of said conic shape of opposed said side wall, each said side wall having a bottom edge, an upper edge, and exterior surface;
   b. a floor proximate to said bottom edges of said side walls, said floor having a conveyor means positioned below said bottom edge of said side walls for moving particulate material loaded into said receiving zone to said delivery end through said discharge door;
   c. a front wall proximate to said forward end; and
   d. a discharge door positioned proximate to said delivery end and remote from said forward end;
   e. a sealing edge longitudinally extending along each of said bottom edges of said side walls, said sealing edge making brushing contact with said receiving zone of said conveyor means, said sealing edge being composed rigid abrasive-resistant material;
   whereby particulate material loaded from above into the receiving zone of said hopper is removed from said receiving zone at said delivery end through said discharge door.

14. The hopper recited in claim 13, wherein each of said sides of said hopper are formed as a segment of a circular conic section.

15. The hopper recited in claim 13, further comprising:
   a. a parallel pair of upper beams extending longitudinally along said upper edge of each said side wall;
   b. a parallel pair of longitudinally extending main beams each having a top and a bottom, the top of each said main beam supporting one said side wall a distance from its said bottom edge along its said exterior surface.

16. The hopper recited in claim 15, further comprising a plurality of generally parallel support structures spaced along the length of said hopper to provide support for said side walls and secured to said exterior surface of said side walls of said hopper, each said support structure comprising:
   a. a coaming stiffener fixed to each said exterior surface of two said opposed side walls, said coaming stiffeners being in opposed relationship with one another and each having a top end and a bottom end, each said coaming stiffener connected at its top end to said upper beam and connected at its bottom end to the said main beam, each said coaming stiffener of a minimum depth at its said top end and of a maximum depth at its said bottom end, each said depth measured in a direction perpendicular to said exterior surface of the said side wall; and
   b. a bottom support member positioned beneath said main beams and connecting said bottom ends of the two said opposed coaming stiffeners.

17. The hopper recited in claim 16, wherein said floor comprises a conveyor means positioned between said main beams and below said bottom edges of said side walls, whereby said conveyor means moves particulate material loaded into said receiving zone to said delivery zone.

18. The hopper recited in claim 17, one or more said support structures further comprising a transverse structure connecting said top ends of said coaming stiffeners, thereby restraining outward movement of said top ends of said coaming stiffeners.

19. The hopper recited in claim 17, further comprising a means for enabling a horizontal component of gravitational force to assist movement of particulate material by said conveyor means towards said delivery end.

20. The hopper recited in claim 15, further comprising a means for enabling a horizontal component of gravitational force to assist movement of particulate material towards said delivery end.

21. The hopper recited in claim 20, wherein the means for enabling a horizontal component of gravitational force to assist movement is provided by elevation of the forward end by an angle of elevation above the horizontal, the elevation accomplished by mounting a tractor towing means to the bottoms of the main beams, the tractor towing means suitable for removable attachment to a fifth wheel mounted to a rear deck of a tractor.

22. The hopper recited in claim 21, wherein the angle of elevation is between 2° and 7°.

23. The hopper recited in claim 21, wherein the tractor towing means comprises a bolster assembly fixedly attached to the bottoms of the main beams and a downwardly directed king pin connected to the bolster assembly, whereby the ends of the main beams extend over the rear deck.

24. The hopper recited in claim 13, said hopper in combination with a trailer for removable connection to a fifth wheel on a tractor for transportation.

25. The hopper recited in claim 13, said hopper in combination with a vehicle for transportation.

26. A trailer for removable connection to a fifth wheel on a tractor for transportation, said trailer comprising:
  a. a hopper having a forward end and a delivery end and comprising:
    (1) two opposed side walls, each said side wall of a conic shape in cross section which is discontinuous of and independent of the conic shape of the opposed side wall, each said side wall having a top edge, a bottom edge, and an exterior surface;
    (2) a parallel pair of upper beams, each said beam extending longitudinally along said upper edge of said side wall; and
    (3) a parallel pair of main beams extending along said side walls, each said main beam positioned on said exterior surface of said side wall;
  b. a conveyor means positioned between said main beams and below said bottom edges of said side walls and having a receiving zone positioned between said forward end and said delivery end of said hopper, whereby said conveyor means moves particulate material loaded into said receiving zone to said delivery zone;
  c. a sealing edge longitudinally extending along each of said bottom edges of said side walls, said sealing edge making brushing contact with said receiving zone of said conveyor means, said sealing edge being composed of rigid abrasive-resistant material;
  d. one or more generally parallel transverse support structures spaced longitudinally along said hopper, one or more of said support structure s encompassing said top beams, said main beams, said side walls, and said conveyor means, each said support structure comprising:
    (1) two opposed coaming stiffeners, said coaming stiffener fixed to said outer surface of each said side wall and having a top end and a bottom end, each of said coaming stiffeners being connected at its top end to the said upper beam extending longitudinally along said upper edge of the said side wall and connected at its bottom end to the said main beam extending longitudinally along the said bottom edge of said side wall, each of said coaming stiffeners being of a minimum depth at its said top end and being of a maximum depth at its said bottom end, each said depth being measured in a direction perpendicular to the said outer surface of the said side wall;
    (2) a bottom support member connecting said bottom ends of said coaming stiffeners, and;
    (3) a transverse beam connecting said top ends of said coaming stiffeners;
  e. means for enabling a horizontal component of gravitational force to assist movement of particulate material by said conveyor means towards said delivery end.

27. A non-linear sided trailer for carrying and discharging a selected range of particulate materials, the trailer with a forward end, a delivery end in spaced relation to the forward end, and a receiving zone between the forward end and the delivery end, each particulate material within the selected range having an angle of repose, the trailer comprising:
  a. two opposed side walls in spaced relationship with one another, each side wall having a bottom edge, an upper edge, an exterior surface and an interior surface, each side wall of a conic shape in cross section, each side wall disposed so that for each point along the interior surface a tangential angle is greater than the angle of repose for particulate materials in the selected range, each conic shape being discontinuous and independent of the other shape;
  b. a conveyor means proximate to the bottom edges of the side walls;
  c. a front wall proximate to the forward end;
  d. a discharge door positioned proximate to the delivery end and remote from the forward end; and
  e. a sealing edge downwardly and tangentially extending along the bottom edge of each side wall to make brushing contact with the receiving zone of the conveyor means;
whereby particulate material loaded from above into the receiving zone is removed by the conveyor means from the receiving zone at the delivery end through the discharge door.

28. The trailer recited in claim 27, wherein the sealing edge is composed of a rigid abrasive-resistant material.

29. The trailer recited in claim 27, wherein the rigid abrasive-resistant material is AR235 steel.

30. The trailer recited in claim 27, wherein the trailer is supported by a frame comprising:
  a. a pair of upper beams extending longitudinally along the upper edge of each side wall;
  b. a pair of main beams, each main beam extending longitudinally along the lower edge of the side wall, the conveyor means disposed between the main beams;
  c. a plurality of support structures, each support structure comprised of two opposed coaming stiffeners each with a top end and a bottom end, a bottom support member connecting the bottom ends of the coaming stiffeners and maintaining the bottom ends in spaced relationship along the bottom support member, and a transverse beam connecting the top ends of the two coaming stiffeners and maintaining the top ends in spaced relationship;
    wherein each coaming stiffener is fixed to the outer surface of the side wall, each coaming stiffener is connected at its top end to the, upper beam and at its bottom end to the main beam, the coaming stiffener has a minimum depth at its top end and a maximum depth at its bottom end, each depth measured in a direction perpendicular to outer surface of the side wall, and the support structure contains the side walls and the conveyor means within its extent.

31. The trailer recited in claim 30, wherein the transverse beam is shaped to prevent accumulation of particulate material entering the receiving zone.

32. The trailer recited in claim 30, wherein the upper beam is shaped to prevent accumulation of particulate material entering the receiving zone.

33. The trailer recited in claim 30, wherein at least one transverse beam has a shock absorbing means, whereby the side walls are allowed to flex in response to road vibration during transportation.

* * * * *